(12) United States Patent
Kotlarski

(10) Patent No.: US 6,226,829 B1
(45) Date of Patent: May 8, 2001

(54) WIPER BLADE FOR MOTOR VEHICLE GLASS PANES

(75) Inventor: Thomas Kotlarski, Buehlertal (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/242,870
(22) PCT Filed: Jun. 10, 1998
(86) PCT No.: PCT/DE98/01676
§ 371 Date: Feb. 25, 1999
§ 102(e) Date: Feb. 25, 1999
(87) PCT Pub. No.: WO99/02381
PCT Pub. Date: Jan. 21, 1999

(30) Foreign Application Priority Data

Jul. 11, 1997 (DE) .......................................... 297 12 293 U

(51) Int. Cl.⁷ .................................. B60S 1/40; B60S 1/38
(52) U.S. Cl. ..................................... 15/250.32; 15/250.43
(58) Field of Search ............................ 15/250.32, 250.43, 15/250.44, 250.451, 250.452, 250.361, 250.46

(56) References Cited

U.S. PATENT DOCUMENTS

| | | | |
|---|---|---|---|
| 1,573,618 | * | 2/1926 | Laganke . |
| 2,056,777 | * | 10/1936 | Evans . |
| 2,276,556 | * | 3/1942 | Zaiger .............................. 15/250.43 |
| 3,132,367 | * | 5/1964 | Wise ................................ 15/250.43 |
| 3,192,551 | * | 7/1965 | Appel .............................. 15/250.43 |
| 3,838,475 | * | 10/1974 | Quinlan et al. . |
| 3,872,537 | * | 3/1975 | Bianchi . |
| 4,120,069 | * | 10/1978 | Sharp et al. ...................... 15/250.32 |

FOREIGN PATENT DOCUMENTS

| | | | |
|---|---|---|---|
| 966610 | * | 4/1975 | (CA) .................................. 15/250.32 |
| 2 344 876 | | 3/1974 | (DE) . |
| 1416851 | * | 9/1965 | (FR) .................................. 15/250.43 |

\* cited by examiner

*Primary Examiner*—Gary K. Graham
(74) *Attorney, Agent, or Firm*—Michael J. Striker

(57) ABSTRACT

A wiper blade (10) is proposed, which is used for cleaning windows (20) of motor vehicles. The wiper blade can be connected by coupling means to counter-coupling means on the wiper arm side of a driven wiper arm (18) provided on the motor vehicle. Its coupling means are placed in the center section of a strip-like, elongated, spring-elastic support element (12) of the wiper blade, on the side of which facing the window to be wiped an elongated, rubber-elastic wiping strip (14), which can be placed against the window, is arranged essentially parallel with the longitudinal axis, and the wiper blade, which can be displaced transversely in respect to its longitudinal direction on the window, is pivotable in respect to the wiper arm around an axis (40) extending in the displacement direction. A particularly low structural height of the wiper blade is achieved if the support element (12) is made of a metal, if moreover the distance of the plane of displacement of the pivot axis (40) from the surface (22) of the window (20) to be wiped is at most as great as the distance (44) between this surface (22) and the strip surface (11) of the support element (12) facing away from the window.

4 Claims, 2 Drawing Sheets

WIPER BLADE FOR MOTOR VEHICLE GLASS PANES

BACKGROUND OF THE INVENTION

With wiper blades of this type, the support element is intended to assure the most even distribution of the contact pressure on the window issuing from the wiper arm for the entire wiped field swept by the wiper blade. By means of an appropriate curvature of the unloaded support element—i.e. when the wiper blade does not rest against the window—the ends of the wiping strip, which are completely placed against the window when the wiper blade is operated, are then stressed in the direction toward the window, even if the radii of curvature of spherically curved vehicle windows change with every wiper blade position. The curvature of the wiper blade therefore must be slightly greater than the greatest curvature measured in the wiping field of the window to be wiped. Thus, the support element replaces the expensive support bow construction with two spring rails arranged in the wiping strip, such as is used in conventional wiper blades.

With a known wiper blade of this type (DE-OS 23 44 876), the support element, which is made of plastic and is therefore comparatively thick, is provided with lateral pivot pins, whose common pivot axis lies closer to the window than the strip surface of the support element facing away from the window. This pivot axis is intended to make possible a relative movement between the wiper arm and the wiper blade, which in all operating positions is required for matching the wiping strip to the course of the window, which is overwhelmingly spherically curved, but does not correspond to a section of the surface of a sphere. The thickness of the support element, which is required for reasons of the desired even distribution of the contact pressure, results in a large structural height, which is undesirable because of the air flow conditions present in front of the vehicle window, since the wiping quality is diminished by it, in particular at high driving speeds.

SUMMARY OF THE INVENTION

It is therefore an object of the present invention to provide a wiper blade for windows of motor vehicles, which eliminates the disadvantages of the prior art.

In keeping with these objects, one feature of present invention resides, briefly stated, in a wiper blade, in which the support element is made of metal, and the distance of a plane of displacement of the pivotaxis of the wiper blade from the surface of the window to be wiped is at most as a great as the distance between this surface and a strip surface of the support element facing away from the window.

When using a support element made of a metal for the wiper blade in accordance with the invention, its thickness can be considerably reduced. Moreover, because of the arrangement in accordance with the invention of the pivot axis in relation to the strip surface of the support element facing away from the window, the guidance of the wiper blade on the window is improved, because tilting forces based on the friction between the wiping strip and the window and acting on the wiper blade are reduced by means of the shortening of the lever arm which is effective in this respect. In this case the support element can also be made in several parts and can have two or more parallel sheet metal strips, for example.

An embodiment of the pivot axis which is easy in actual use results, if the pivot axis is constituted by the common longitudinal axis of two pins, which are arranged opposite each other on the support element and project past its longitudinal edges.

A cost-effective arrangement of the pins on the metallic support element is achieved if they are arranged on a separate component, which is a part of the support element and is fixedly connected with the support element.

The requirement for the lowest possible structural height of the wiper blade is met in a particularly advantageous manner if, in a further development of the invention, the component is designed to be U-shaped in cross section, if the base of its U rests with its inside against the strip surface of the support element facing away from the window, wherein the legs of the U respectively extend around a longitudinal edge of the support element, and if finally a pin is arranged on the exteriors of each U-shaped leg which face away from each other. Such a structure also leads to a cost-effective and permanent connection between the support element and the component.

The component can be produced simply and cost-effectively from a plastic material, wherein the pins have been formed on it in one piece.

A bearing receptacle provided on the wiper arm is assigned to each one of the two pins for providing the required pivot seating.

Further advantageous developments and embodiments of the invention are recited in the following description of an exemplary embodiment represented in the associated drawings.

BRIEF DESCRIPTION OF THE DRAWINGS

Shown in the drawings are.

DESCRIPTION OF THE PREFERRED EMBODIMENT

Figure 1:
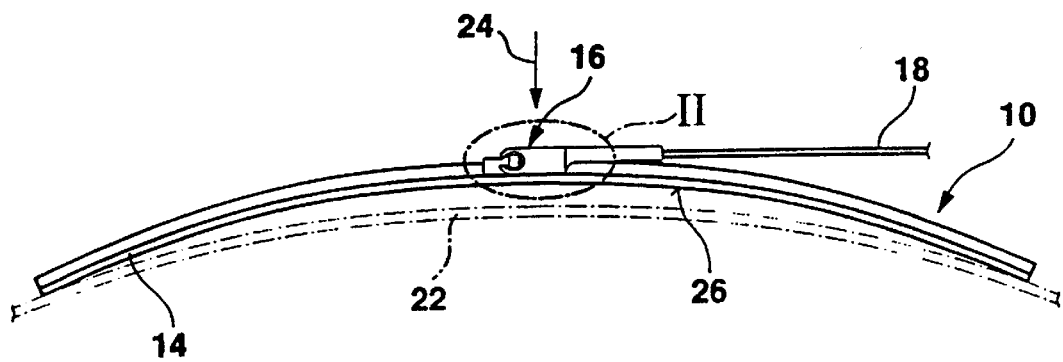
in FIG. 1, a lateral view of a wiper blade in accordance with the invention, which is connected with a wiper arm, in FIG. 2, an enlarged representation of a detail identified by II in FIG. 1, in FIG. 3, a view from above on the hinged connection between the wiper blade and the wiper arm represented in FIG. 2, partially in section along the line III—III in FIG. 2, and in FIG. 4 a section along the line IV—IV in FIG. 2 through the support element, which has been released from the wiper arm and from which the wiping strip has been removed.

A wiper blade 10 represented in FIG. 1 has a strip-like, elongated, spring-elastic support element 12 (FIG. 2), on whose underside 13 an elongated, rubber-elastic wiping strip 14 is fastened parallel with the longitudinal axis. On the top of the support element 12, which can also be called a spring rail, a connecting device 16 is arranged in the center section of the latter, with the aid of which the wiper blade 10, can be hingedly and releasably connected with a driven wiper arm 18. The wiper arm 18 is loaded in the direction of the arrow 24 toward the window 20—for example the windshield of a motor vehicle—whose surface is indicated by a dash-dotted line 22 in FIG. 1. Since the dash-dotted line 22 is intended to represent the greatest curvature of the window surface, it can be clearly seen that the curvature of the wiper blade 10, which rests with both its ends against the window, is greater than the maximum window curvature. The wiper blade 10 rests with its wiping lip 26 over its entire length on the window surface 22 under the contact pressure (arrow 24). In the process, a tension builds up in the spring-elastic support element 12 made of metal, which provides the correct placement of the wiping strip 14, or respectively its wiping lip 26, over its entire length on the window 20, as well as an even distribution of the contact pressure (arrow 24). Since the window, which as a rule is spherically curved, does not represent a section of the surface of a sphere, the wiper blade 10 must be continuously able to adapt itself to the respective position of the window surface 22 during its wiping motion. For this reason the connecting device 16 is embodied at the same time as a hinged connection.

Figure 3:
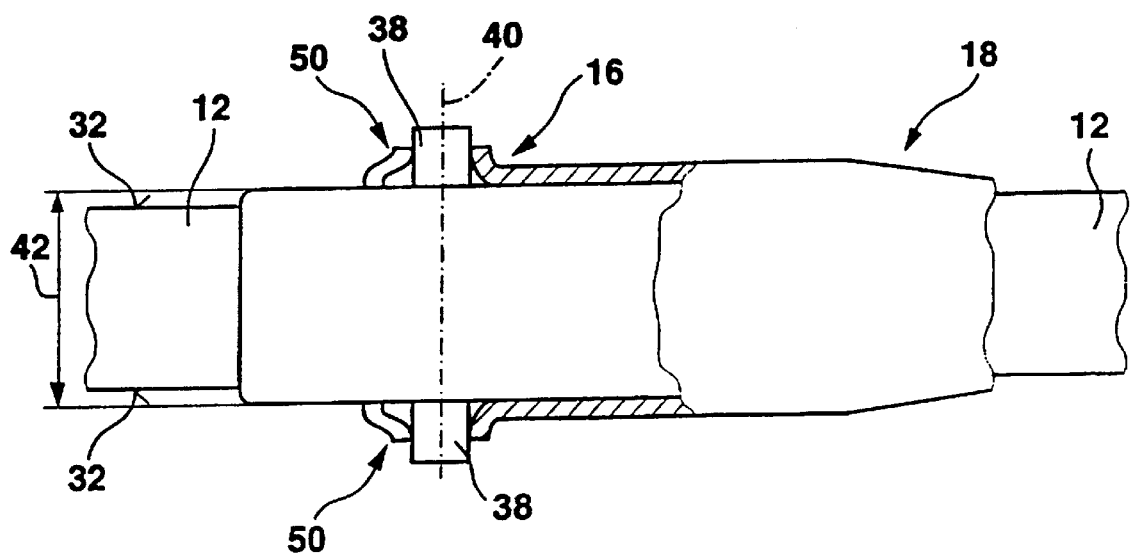
Figure 4:
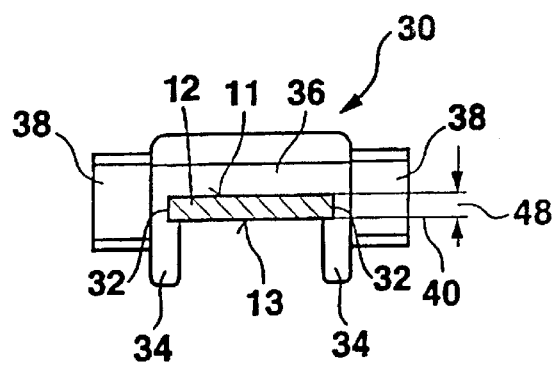

In what follows, the connection between the support element 12 and the wiper arm 18 will be explained in greater detail by means of FIGS. 1 to 3. Coupling means on the wiper arm side and the wiper blade side are a part of the connecting device 16. In the exemplary embodiment, the coupling means on the wiper blade side are formed on a component 30, which is a part of the support element 12 and is fixedly connected with the support element 12. The component 30, which is made of a plastic material, essentially has a U-shaped cross section. As represented in FIG. 4, the support element 12 is seated with its two longitudinal edges 32 in the U-shaped legs 34 of the component 30. The base 36 of the U of the support element 12 rests with its inside against the top 11 of the component 30. Pins 38, which are located opposite each other and extend away from each other and which are for one engaged by coupling elements on the wiper arm side and, furthermore as bearing pins provide a hinged connection between the wiper arm 18 and the wiper blade 10, are arranged on the U-shaped legs 34 of the component 30. For this purpose, the two pins 38 have a common longitudinal or pivot axis 40. As represented in FIG. 1, the component 30 is fastened on the center section of the support element 12, which is made of metal. The pivot axis 40 extends transversely in respect to the longitudinal axis of the elongated wiper blade 10 which, during the wiping operation, is displaced transversely to its longitudinal extension over the window 20 to be wiped in the direction of the two-headed arrow 42 (FIG. 3).

Figure 2:
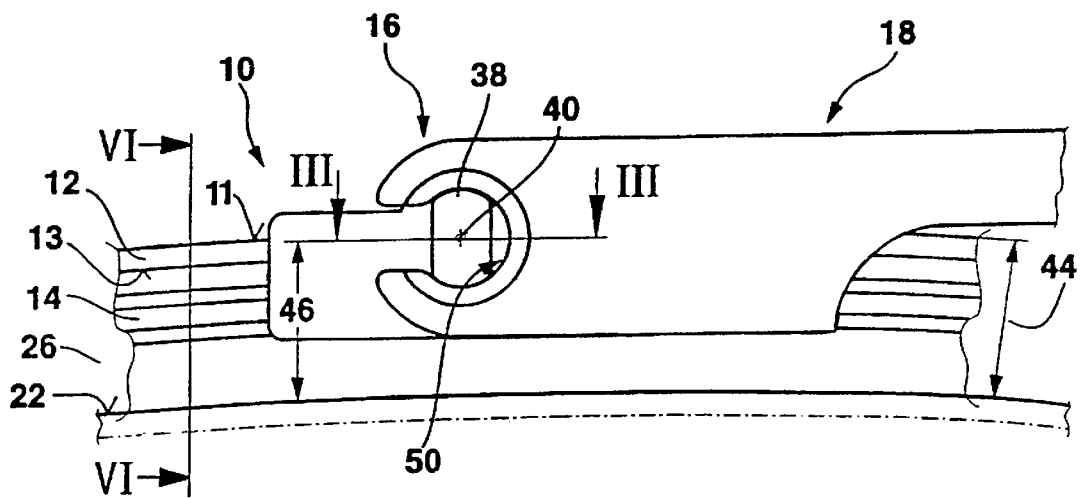

FIG. 2 shows that the wiper blade 10 placed on the window 20 has a structural height 44, which corresponds to the distance 44 between the window surface 22 and the surface 11 of the support element 12 facing away from the window 20. A value 46 is shown in FIG. 2, which results from the distance between the surface 22 of the window 20 to be wiped and the longitudinal or pivot axis 40.

If, as indicated in FIG. 2, the wiper blade is in its operating position and is conducted by the driven wiper arm 18 in the direction of the two-headed arrow 42 over the surface 22 of the window 20 to be wiped, the pivot axis 40 moves in a plane which extends at least approximately parallel in respect to the surface 22 of the window 20. The distance of this plane from the surface 22 of the window 20 corresponds to the value 46. It can be clearly seen in FIG. 4, that the longitudinal or pivot axis 40 of the two pins 38 lies closer toward the window surface 22 by a value of 48 than the top 11 of the support element 12. The value 48 corresponds to the difference between the values 44 and 46.

The result of this is that the pivot axis 40 moves in a plane extending at the distance 46 from the window essentially parallel in respect to the latter. In order to obtain the lowest possible structural shape of the wiper blade, this value 46 has been selected such that it is at most as large as the distance between the window surface 22 and the upper strip surface 11 of the support element 12 facing away from the window 20. This is achieved in a particularly simple manner in that the component 30 has an essentially U-shaped cross section, and that the two pins 38 are arranged on the U-shaped legs 34, which project past the support element 12 on both its longitudinal sides. If this component 30 is made from a plastic material, the pins 38 can be suitably formed in one piece on it. As represented in FIG. 3, a bearing receptacle 50 provided on the wiper arm 18 has been assigned to each one of the two pins 38. The design of the bearing receptacles 50 can be seen in FIG. 2. It permits a simple connection of the wiper blade 10 to the wiper arm 18 with the aid of a so-called plug-revolving connection, which prevents the unintentional release of the wiper blade 10 from the wiper arm 18 during the operation of the wiper blade.

The two bearing receptacles 50 constitute the counter-coupling means on the wiper arm side for the coupling means of the wiper blade 10, which are constituted by the two pins 38 fixedly connected with the support element 12.

I claim:

1. A wiper blade (10) for windows of motor vehicles, which can be connected by coupling means on a wiper blade side to counter-coupling means of a driven wiper arm (18) provided on the motor vehicle, wherein the coupling means on the wiper blade side are placed in a center section of a strip-shaped, elongated, spring-elastic support element (12) of the wiper blade (10), on a side of which facing the window (20) to be wiped an elongated, rubber-elastic wiping strip (14), which can be placed against the window, is arranged essentially parallel with a longitudinal axis, and the wiper blade, which can be displaced transversely in respect to its longitudinal direction on the window (20), is pivotable in respect to the wiper arm (18) around a pivot axis (40) extending in a displacement direction (42), said pivot axis being constituted by a common longitudinal axis of two pins (38), said pins are arranged opposite each other on the support element (12) and project past the longitudinal edges of the latter, said pins are arranged on a separate component (30), which is part of the support element (12) and is fixedly connected with the support element (12), the support element (12) is made of a metal, and a distance (46) of a plane of displacement of the pivot axis (40) from a surface (22) of the window (20) to be wiped is at most as great as a distance (44) between this surface (22) and a strip surface (11) of the support element(12) extending over a length of the support element (12) and facing away from the window (20).

2. The wiper blade in accordance with claim 1, characterized in that the component (30) is made of a plastic material and that the pins (38) are formed in one piece on it.

3. The wiper blade in accordance with one of claims 1, characterized in that a bearing receptacle (50) provided on the wiper arm (18) is assigned to each of the pins (38).

4. A wiper blade (10) for windows of motor vehicles, which can be connected by coupling means on a wiper blade side to counter-coupling means of a driven wiper arm (18) provided on the motor vehicle, wherein the coupling means on the wiper blade side are placed in a center section of a strip-shaped, elongated, spring-elastic support element (12) of the wiper blade (10), on a side of which facing the window (20) to be wiped an elongated, rubber-elastic wiping strip (14), which can be placed against the window, is arranged essentially parallel with a longitudinal axis, and the wiper blade, which can be displaced transversely in respect to its longitudinal direction on the window (20), is pivotable in respect to the wiper arm (18) around an axis (40) extending in a displacement direction (42), the support element (12) is made of a metal, and a distance (46) of a plane of displacement of the pivot axis (40) from a surface (22) of a window (20) to be wiped is at most as great as a distance (44) between this surface (22) and a strip surface (11) of the support element (12) facing away from the window (20), and a component (30) is designed U-shaped in cross-section, its base (36) rests with its inside against an upper strip surface (11) of the support element (12) facing away from the window (20), wherein legs (34) respectively project past a longitudinal edge (32) of the support element (12), and a pin (38) is arranged on outsides, facing away from each other, of each leg (34).

* * * * *